United States Patent [19]

Muccillo, Jr.

[11] Patent Number: 4,601,356

[45] Date of Patent: Jul. 22, 1986

[54] SUSPENDED PLATFORM SCALE STRUCTURE

[76] Inventor: Vincent J. Muccillo, Jr., 952 La Jolla Rancho Rd., La Jolla, Calif. 92037

[21] Appl. No.: 697,240

[22] Filed: Feb. 1, 1985

[51] Int. Cl.$^4$ .................. G01G 3/14; G01G 19/52; G01G 21/28; G01G 21/12

[52] U.S. Cl. .................................. 177/211; 177/132; 177/244; 177/255; 177/263

[58] Field of Search ............... 177/132, 134, 244, 255, 177/211, 263, DIG. 9

[56] References Cited

U.S. PATENT DOCUMENTS

| | | | |
|---|---|---|---|
| 3,512,595 | 5/1970 | Laimins | 177/255 X |
| 3,736,998 | 6/1973 | Flinth et al. | 177/255 X |
| 4,361,199 | 11/1982 | Ulicny | 177/211 X |
| 4,466,501 | 8/1984 | Karpa | 177/255 X |

*Primary Examiner*—E. A. Goldberg
*Assistant Examiner*—Patrick W. Foster
*Attorney, Agent, or Firm*—Baker, Maxham & Jester

[57] ABSTRACT

A low profile platform scale includes a generally rectangular peripheral base support frame formed of channel members with a plurality of load cells mounted adjacent the corners of the base frame and including support arms from which is suspended a load support platform frame that has a generally rectangular configuration confined within the base frame and including arms extending within the channel of the support member and connected to suspend from the load arms of the load cells by flexible suspension cable structures extending through the base frame structure. Adjustment for range of the scale is provided in the form of alternate suspension positions on the load arms of the load cells.

9 Claims, 3 Drawing Figures

4,601,356

SUSPENDED PLATFORM SCALE STRUCTURE

BACKGROUND OF THE INVENTION

The present invention relates to scales and pertains particularly to electronic platform scales.

Platform scales typically have a support platform resting on a base support structure with a weight measuring or sensing structure disposed between the platform and the base support structure. Typically, the support platform rests on the weight sensing structure. This provides an arrangement wherein minimum vertical height is required and many times lateral forces on the weight platform affect the weight sensing mechanism and the weight reading.

Present suspension type scales require obstructive boxes attached to the side frame housing to cover the load cell. These boxes restrict the loading and unloading of packages or the like on the platform.

Accordingly, it is desirable that improved platform scales be available.

SUMMARY AND OBJECTS OF THE INVENTION

It is the primary object of the present invention to provide an improved suspension platform scale.

In accordance with the primary aspect of the present invention, a low profile platform scale comprises a base frame with a plurality of load cells disposed about the frame with support arms for the load cells and a load support platform suspended within the frame from the load arms of the load cells by flexible linkage means that eliminate lateral forces on the load cells.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
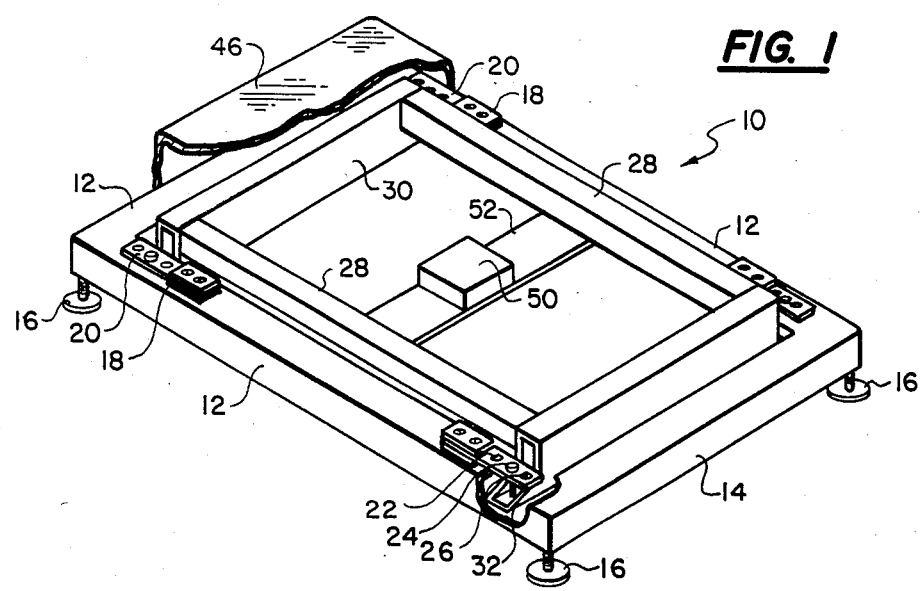
FIG. 1 is a perspective view of the support structure with portions broken away to reveal detail.
Figure 2:
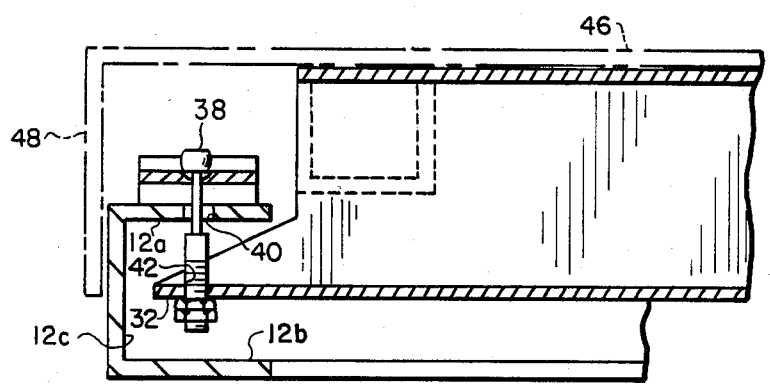
FIG. 2 is a section view taken generally on lines 2—2 of FIG. 1.

Referring to FIG. 1 of the drawings, a scale structure in accordance with the invention is illustrated and designated generally by the numeral 10. This scale structure comprises a base frame of a generally rectangular configuration formed of side rails 12 extending generally parallel and connected together at the ends by end rails 14. The base frame is constructed of a channel member as can be seen in FIG. 2 with the opening of the channel extending inward to the center of the rectangular frame structure. The base frame is supported by means of leveling feet or jacks 16 which comprise a foot portion and a screw portion threadably engaging a nut structure, not shown, in the lower portion of the base frame to enable leveling of the base frame structure.

Figure 3:
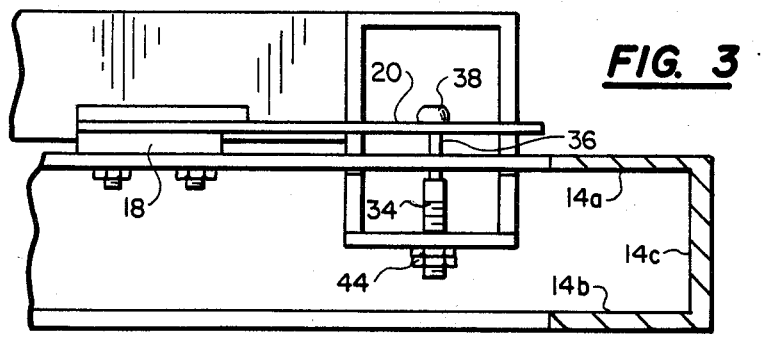
FIG. 3 is a section view taken generally on lines 3—3 of FIG. 2.

The channel base frame thus provides a laterally inwardly open channel defined by upper and lower sections 12a and 12b connected by a side section or portion 12c forming the channel. The end portion forms a like structure with upper portion 14a and lower portion 14b joined by a center portion 14c as shown in FIG. 3. This provides space, as will be described, within which the load support platform is suspended.

A plurality of load cells 18 each having a load arm 20 are mounted adjacent each corner of the base frame. The load cells are each positioned back slightly away from the end rails 14 where the arms 20 extending toward the corner or end of the corner. Each arm includes a plurality of load position bores 22, 24 and 26, respectively. These permit adjustment of the scale for particular load ranges as will be described.

The load support frame of the scale comprises a pair of box-like side rails 28 connected together at the ends by a pair of similar box-like end rails 30 having a greater depth than the side rails. The end rails 30 additionally include suspension arm 32 extending outward from the end thereof and into the side channels 12. The support frame is thus confined within and generally encompassed by the base frame.

A flexible suspension link comprises a lower threaded shank 34 and an upper cable member 36 suspends the load support platform from the arms 20 of the load cells 18. The suspension link includes a ball member 38 at the upper end of the cable section 36 which seats within a spherical recess formed within the upper end of the respective load range bores 22, 24 and 26 in the load arms 20.

The support link extends through a bore 30 in the upper member 12a of the side channels 12. The threaded shank member 34 extends through a bore 42 formed in the arm 32 and is secured in place by one or more threaded nuts 44. The adjustable support links enable balancing of the load platform frame 28 from the respective load cells.

The load range of the unit may be selected by selecting the load support bores 22, 24 and 26 from which the load platform is suspended. This may be achieved by movement of the load cell toward and away from the link member as shown in FIG. 1 by positioning the respective bores 22–26 in alignment with the bore 42 of the support arm 32. Alternatively, the positioning of the bore 42 and the load arm 32 may be altered to align with the respective one of the bores 22–26. In any event, a higher range is achieved by suspending from the bore 22 than from the bore 24. Similarly, a lower range of weight is obtained from suspension from bore 26.

As can be seen in FIGS. 2 and 3, the above arrangement of the base frame and load support frame provides for a lower profile structure with approximately one-half of the height of the load support frame disposed below the upper surface of the base frame.

A load platform cover plate 36 having a generally inverted open box configuration rests on the upper surface of the load support frame 28 with an upper generally planar surface and a downwardly depending peripheral skirt 38 that extends downwardly to overlap the base support frame 14 and thereby encompass the unit and basically encapsulates the unit and the load cells.

The load cells 18 are of a generally well known type and generates a form of electrical signal in response to a load or strain placed thereon. The typical cell changes in resistance to generate a signal in response to the strain placed on the cell. Preferably, the response is a linear function of the load or may be programmed through electronic means to achieve a linear function such that calibration is achieved. The load cells are connected to a common sunning unit shown generally at 50 which may be located centrally within the frame work and supported such as by the cross member 52 connected between the side rails 12 of the base support frame.

The above described platform scale construction provides numerous advantages over the conventionally known platform scale construction. Among the advantageous features are the suspended weight bridge which comprises a platform and the load support frame, or spider as it may be called, which removes errors that are normally involved in compression type systems. The cable ball suspension assembly, with the ball head screw cable, provides self-alignment which allows for horizontal movement for shock loads and additionally removes side load errors. The adjustable load cells and the selectable range capacities provide simple adjustability of the system.

The described construction provides an improved low profile scale with all load cells suspended below the platform providing a low profile of two and three eights inch height from floor to the top of the platform. The described system, because of the suspension, results in increased accuracy because of direct one to one reading cell and elimination of side loading and binding.

While I have illustrated and described my invention by means of specific embodiments, it is to be understood that numerous changes and modifications may be made therein without departing from the spirit and scope of the invention as defined in the appended claims.

I claim:

1. A low profile platform scale comprising:
a base frame of a generally rectangular configuration defined by a peripheral inwardly opening channel;
a plurality of load cells mounted on said base frame;
a support arm secured to each of said load cells;
load support platform means comprising a generally rectangular support frame disposed within the perimeter of and at least partially below said base frame;
suspension means comprising a plurality of suspension arms extending outward from said support frame into the channel of said base frame, and flexible means connecting said arms to said load cells;
said load cells each includes a selectable load arm; and
said flexible means is connected between said arms on said platform support frame and said selectable load arms.

2. A platform scale according to claim 1 wherein:
said load arms include a plurality of selectable load sockets; and
said flexible means includes a ball member for connecting to a selected one of said sockets.

3. A platform scale according to claim 2 wherein:
said base frame has an upper surface;
said load cells are mounted on said upper surface;
said platform support frame is disposed partially below said upper surface and partially above said upper surfaces; and
said flexible means extends through said upper surface between said arms.

4. A platform scale according to claim 3 comprising:
leveling legs at each corner of said base frame.

5. A low profile platform scale comprising:
a generally rectangular peripheral base frame formed of inwardly directed or opening channel members;
a plurality of load cells mounted on said base frame approximate the corner thereof and each including a load support arm, said load supprt arms are selectable in length;
a load support frame having a generally rectangular configuration confined within said base frame and including suspension arms extending into the channel members of the base frame; and
flexible suspension means connecting said load support arms to said suspension arms, and including flexible means for eliminating side loading.

6. The platform scale of claim 5 wherein said support link comprises a spherical ball engaging a spherical socket on said load support arm.

7. A low profile platform scale comprising:
a base frame of a generally rectangular configuration defined by a peripheral horizontally inwardly opening channel;
a plurality of load cells mounted on said base frame;
a support arm secured to each of said load cells;
load support platform means comprising a generally rectangular support frame disposed within the perimeter of and at least partially below said base frame;
suspension means comprising a plurality of suspension arms extending outward from said support frame into the channel of said base frame, each arm terminating at a position below a corresponding one of said load cells, and vertically extending flexible means connecting said arms to said load cells.

8. A platform scale according to claim 7 wherein:
said vertically extending flexible means comprises a cable having a ball on one end thereof; and
said ball seats in a socket in one of said load cells and said arms.

9. A platform scale according to claim 8 wherein:
said base frame has an upper surface;
said load cells are mounted on said upper surface; and,
said cable extends through said upper surface between said arms and said load cells.

* * * * *